March 10, 1970 B. ZINBARG 3,499,821

LAMINATED BOARD PARTICULARLY FOR PRINTED CIRCUITS, AND METHOD OF MANUFACTURE

Filed May 18, 1965

INVENTOR
BENSON ZINBARG

BY Albert M. Zalkind

ATTORNEY

United States Patent Office 3,499,821
Patented Mar. 10, 1970

3,499,821

LAMINATED BOARD PARTICULARLY FOR PRINTED CIRCUITS, AND METHOD OF MANUFACTURE

Benson Zinbarg, Stamford, Conn., assignor to New England Laminates Company, Inc., Stamford Conn.

Filed May 18, 1965, Ser. No. 456,732
Int. Cl. B32b 17/10, 27/38, 29/02
U.S. Cl. 161—185 18 Claims

ABSTRACT OF THE DISCLOSURE

The invention provides a strong structural laminated board particularly for use in the electronic industries in which rigidity is effected by impregnation with expoy resin of a plurality of laminations comprising cotton batt, cotton cloth and glass fiber.

The making of thin boards of dielectric materials is well known and such boards have found many uses, being particularly useful in the making of so-called printed circuits wherein conductive paths are produced by etching of a metal foil surface.

The usual construction of prior art circuit boards comprises the laminating of seven or more layers of glass fiber cloth suitably impregnated with resins and cured under heat and pressure to a substantially stiff, flat and thin board-like material having one or both surfaces faced with metallic foil. Such prior art laminate products have various drawbacks not only as to expense of manufacture because of the many layers of relatively costly glass cloth involved, but for the further reason that when used for printed circuit boards it is difficult to punch small holes. Glass cloth has a very abrasive effect on tools and, therefore, tools require frequent resharpening. Further, it is not possible to punch a completely smooth hole in prior art boards. Where smooth holes are required, drilling is necessary. There are certain circumstances wherein smooth holes are required when it is necessary to plate through the hole for establishing a connection between foil paths on both sides of the board.

The above and other drawbacks of prior art materials are overcome by the present invention which has among its objects the provision of economically manufacturable board, using conventional machinery and apparatus in processing.

Another object is the devising of a simple method for making a relatively low cost and easily punchable board.

A further object is providing a board which can be held to close tolerances in thickness relative to conventional nominal thickness of 1/16", or other thicknesses as may be required.

A still further object is to provide a board which will be highly resistant to bending under ambient heat conditions, and resistant to chemical, gaseous and other destructive media as well as having good dielectric properties.

Other objects and features of the invention will be apparent from the discussion to follow.

Briefly, the invention comprises a laminated article having exterior laminations of fiber glass cloth on the external surfaces of which may be carried metallic foil, wherein the structure has a core comprised of cotton batt and woven cotton cloth. The cotton batt is faced on both sides with cotton cloth, the latter cloth being adjacent the fiber glass outer layers. The entire structure is impregnated with thermosetting epoxy resin compound which rigidifies the board as well as effecting permanent bonding of the several layers. A particular feature of the construction is the use of relatively cheap core materials which serve to space the external glass cloth layers from each other for effecting resistance to bending. This is in contrast to prior art constructions wherein many relatively expensive inner layers of glass cloth are used to effect the same thickness of final board. Thus, the core is not only a spacer, but by rendering the cotton batt pliable with a lubricating oil in the course of manufacturing, the resin impregnant in the batt is plasticized. This leaves a batt which can be more easily and smoothly punched whereby the tools for punching last longer than those used by prior art boards, the plasticized batt having a lubricant effect.

The method of making the product comprises the initial step of stitching woven cotton cloth on both sides of cotton batt to thereby maintain the batt against pulling apart or distortion in the first processing step which consists of running the stitched composite through a resin bath wherein the resin is mixed with a lubricating oil as a filler or extender. This is in contrast to prior art methods wherein the bath is extended with powdered clay or talcum, such ingredients producing a final product which is very hard in abrasive effect on punching and drilling tools. It has further been found that by using oil instead of clay the resinous mixture can homogeneously permeate the batt whereas clay or talcum tends to be filtered so as to lodge in the exterior regions of the core.

The composite core, having been run through the bath, is then partially cured in a continuous oven, effecting a dry pre-preg or so-called B-stage, as termed in the industry. Glass cloth web is then impregnated with a suitable resin compound which may be the same as for the core, but lacking the oil filler, likewise being partially cured after impregnation being thus unlubricated. Finally, the pre-preg core and pre-preg glass cloth layers are assembled and fully cured in a platen press yielding a final product having all the advantageous characteristics described above.

It has been found that the stitching minimizes the tearing of the batt due to extrusion of resin at the edges of the assembly when pressure is applied by the platen, which extrusion effect could be damaging to the batt, and might otherwise cause non-uniform board thickness.

If the board is to be used for printed circuitry, metallic foil may be applied to the exterior surface of the glass cloth layers in the final curing step whence the heat and pressure produce permanent adherence of the foil by virtue of the resin impregnant in the glass cloth layers.

A detailed description of the invention now follows, in conjunction with the appended drawing in which.

Figure 1:
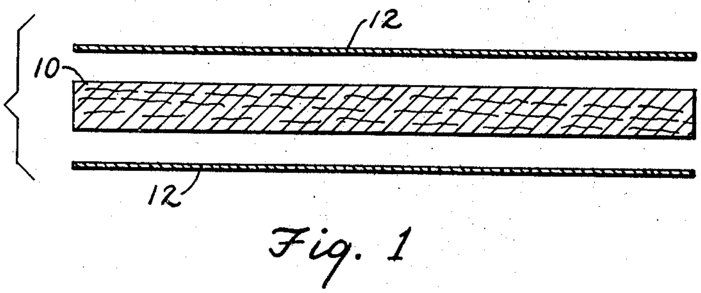
FIGURE 1 is an exploded cross-sectional elevation of the laminations for effecting the core of the board.
Figure 4:
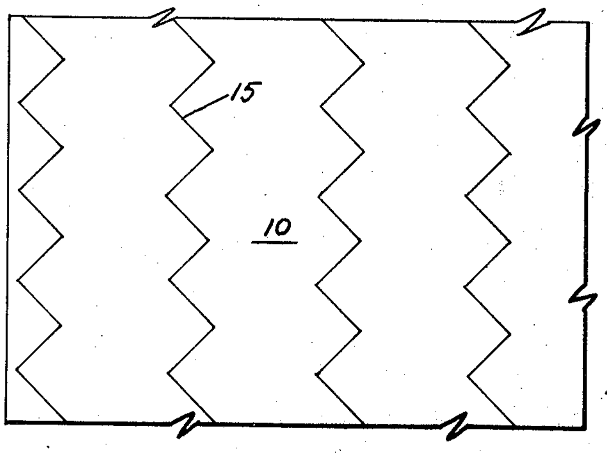
FIG. 4 is a plan view showing one type of stitching pattern for the core.

Referring to FIGURE 1, the view therein shows a cotton batt 10 which may be of any suitable thickness. For example, for a final board thickness of 1/16", the batt would be about 3/16" thick. To each surface of the batt there is mechanically secured a cotton woven cloth layer 12 which is of considerably greater tensile strength than the batt. Such mechanical reinforcement may be effected by stitching the cloth layers to the batt with a suitable pattern of stitching rows 15; for example, the zig-zag pattern shown in FIGURE 4, and such stitching may be suitably accomplished by passing the batt and cloth layers through a conventional mattress stitching machine as a composite web 40"–50" wide. Zig-zag stitching is preferred as compared with straight stitching in order to impede extrusion of binder composition when under the heat and pressure of the final curing step.

The reinforcing members 12 may be cloth or paper, gauze or cheesecloth, or any other suitable material which can be impregnated by conventional binders, and the purpose of such members is not only to strengthen the product but also for the very important purpose of preventing the destruction or pulling apart of the relatively soft and fluffy batt when it is being processed through a bath of binder composition in any conventional machine for accomplishing impregnation.

Such bath is comprised preferably of a mixture of conventional epoxy resin, for example, Shell Epon 1001 or Dow Der 511 mixed with a lubricating oil such as Mobisol "66" or Mobisol "44." The formulation of the mixture is not critical and is preferably in the range of 10% to 50% by weight of oil to weight of the resin. Conventional hardening agents are added to the mix as will be understood by persons skilled in the art. For example, benzyldimethylamine, dicyandiamide, plus solvent, in suitable proportion either before or after the oil is introduced.

The lubricating oil acts as a plasticizer for the epoxy resin and after the quilted core is passed through the bath the core is partially cured by heat treatment to a dry state, thus effecting a so-called pre-preg or B-stage. Fiber glass cloth is in a similar manner passed through an epoxy resin bath which may be of the same type as the core bath, except that no plasticizer is used. Thus impregnated, the glass cloth is likewise partially cured.

It will be appreciated that the quilted composite core may be taken from a roll and passed as a web through the bath and partial cure stage, as may the glass cloth.

Figure 2:
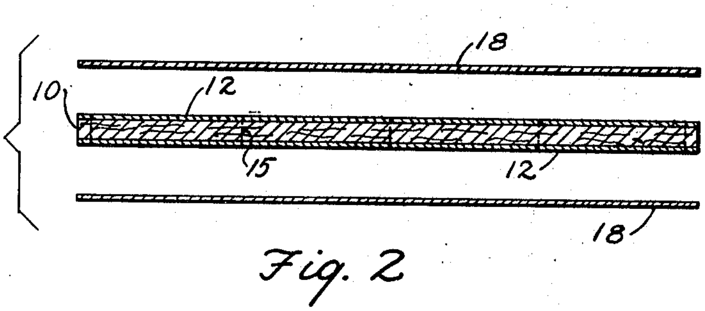
FIGURE 2 is an exploded cross-sectional elevation of the assembled core and the glass cloth external laminations.

In order to form the final article, a sheet of pre-preg glass cloth 18 is assembled on each side of the pre-preg composite core effecting laminations, as illustrated in FIGURE 2, and the assembly is subjected to heat and pressure in a conventional platen press where final cure under heat and pressure is effected to form a solid laminate of the several layers.

It will be noted that the process can be completely continuous with the pre-pregs being fed to heated pressure rollers for effecting final cure. In any event, the final product yields a hard surfaced, smooth, and strong laminated article having a plasticized core by virtue of the oil used in the core bath. The board is thus readily machinable and and punchable by virtue of the pliability of the core whence tool wear is considerably reduced as compared with prior art methods and constructions and provides very smooth bore punched holes.

Figure 3:
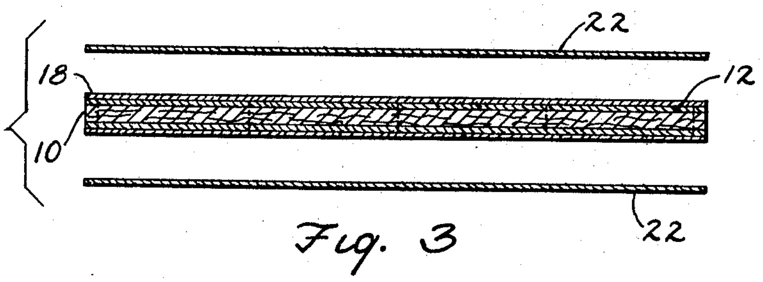
FIGURE 3 is an exploded cross-sectional elevation of the assembly of the core and glass cloth laminations showing foil surfacing to be applied.

If the board is to be used for printed circuitry, foil sheets 22, as shown in FIGURE 3, may be used as external surfacing in assembly prior to final pressure so that the binding effect of the epoxy resin impregnating the glass cloth causes adherence of the foil thereto. The final product compares very favorably as to strength factor with laminates made entirely of fiber glass cloth and is decidedly superior to paper laminates.

The method described above is advantageous in that it affords very close control of the final thickness due to the combining of the batt and cotton cloth which are commercially provided in a wide variety of thicknesses.

Further, the greater the thickness of board required, the greater the economy in proportion thereto, since the thickness is effected by additional cotton batt thickness, a relatively cheap material. By the method taught herein, it would be possible to produce punchable boards in thicknesses which would be impractical by prior art methods since the many layers of glass cloth required therein would be prohibitively expensive and ruinous to tools, while in the present invention only two glass cloth layers are used.

Although epoxy resin has been mentioned, other plastic media such as phenolics, polyesters, or other thermosetting resins are usable.

Having thus described my invention, I am aware that various changes may be made without departing from the spirit thereof, and accordingly, I do not seek to be limited to the precise illustration herein given except as set forth in the appended claims.

I claim:

1. A rigid laminated article comprising a pair of external laminations spaced by and adherent to a core permeated with a lubricant which is a liquid initially at least, and also permeated with a binder, and said binder being cured to effect said rigidity and compatible for lubricating purposes with said lubricant in said core to facilitate subsequent machining.

2. A rigid article comprising a pair of external glass cloth laminations spaced by a contiguous core lamination comprising an unwoven batt, said core and said glass cloth laminations being impregnated with a binder cured to rigidify said article, said core further comprising a woven cloth lamination bonded to the surface of said batt and to a surface of at least one of said glass cloth laminations.

3. A rigid article comprising a pair of external glass cloth laminations spaced by a contiguous core lamination comprising an unwoven batt, said core and said glass cloth laminations being impregnated with a binder cured to rigidify said article, said core further comprising a paper lamination bonded to the surface of said batt and to a surface of at least one of said glass cloth laminations.

4. A rigid laminated article as set forth in claim 1, including a metallic facing on at least one surface thereof bonded thereto.

5. A rigid article comprising a pair of external glass cloth laminations spaced by a contiguous core lamination comprising an unwoven batt, said core and said glass cloth laminations being impregnated with a binder cured to rigidify said article, said binder means comprising a resin and a plasticizer impregnating said batt.

6. A laminated article as set forth in claim 5, said glass cloth laminations being impregnated with a non-plasticized resin compatible with the binder means impregnating said batt.

7. A rigid laminated article comprising a pair of external glass cloth laminations spaced by a liquid-lubricated core lamination comprising an unwoven cotton batt, said core and said glass cloth laminations being impregnated with a binder cured to rigidify said article, including a reinforcing lamination bonded between said batt and a glass cloth lamination and having a greater tensile strength than said batt, whereby said core will provide lubrication for passage of tools through said article.

8. A laminated article as set forth in claim 7, said additional lamination being mechanically secured to said batt.

9. A laminated article comprising a pair of external glass cloth laminations spaced by a contiguous core lamination comprising an unwoven batt faced with reinforcing laminations of material having greater tensile strength than said batt, said laminations of material being mechanically secured to said batt, said core being impregnated with a composition of epoxy resin and lubricating oil, said glass cloth laminations being impregnated with epoxy resin compatible with said composition, whereby said composition functions to produce a plasticized core more yieldable to tools than said glass cloth laminations and effects lubrication of tools piercing said article.

10. A laminated article as set forth in claim 9, wherein said reinforcing laminations are of woven material.

11. A laminated article as set forth in claim 9, wherein said reinforcing laminations are of paper.

12. A method of making a laminated article which comprises impregnating a fibrous batt with a binder, modified by a plasticizer forming part of said binder, partially curing said impregnated batt, assembling said batt with a layer of glass cloth impregnated with a compatible binder, and curing said assembly to produce a rigid article having a hard lamination and a plasticized lamination.

13. A method of making a laminated article which comprises mechanically reinforcing a fibrous batt with a material of greater tensile strength, passing the resulting structure through a bath of binder composition, assembling said resulting structure as a core between laminations of binder impregnated material, and subjecting said assembly to a curing process.

14. A method of making a laminated article which comprises impregnating a batt with a binder composition having a plasticizer ingredient, partially curing said impregnated batt to a dry state, assembling said batt as a core between two layers of dielectric material impregnated with a non-plasticized partially cured binder, and subjecting said assembly to a curing process thereby producing a laminated article having two outer layers which are relatively harder than the plasticized core which is positioned therebetween.

15. A method as set forth in claim 14, wherein said batt is of cotton, said binders are epoxy resin and said plasticizer is lubricating oil.

16. A method as set forth in claim 14, including the step of reinforcing said batt which comprises the stitching of a woven cloth to both sides thereof.

17. A method as set forth in claim 14, wherein the step of reinforcing said batt comprises mechanically securing a sheet of material thereto having higher tensile strength than said batt.

18. A laminated article comprising a pair of external glass cloth laminations spaced by a contiguous core lamination comprising an unwoven batt faced with laminations of material having greater tensile strength than said batt and being mechanically secured to said batt, said core being impregnated with a composition of epoxy resin and lubricating oil, said glass cloth laminations being impregnated with epoxy resin compatible with said composition, whereby said composition functions to produce a plasticized core more yieldable to tools than said glass cloth laminations and effects lubrication of tools piercing said article, and a metallic surface member secured to at least one face of said article.

References Cited

UNITED STATES PATENTS

| | | | |
|---|---|---|---|
| 1,370,666 | 3/1921 | Novotny | 117—11 X |
| 1,414,420 | 5/1922 | Kempton | 161—259 X |
| 2,632,187 | 3/1953 | Wooffendale | 5—354 |
| 2,938,822 | 5/1960 | Nelson | 161—84 |
| 3,203,849 | 8/1965 | Katz et al. | 161—96 |
| 3,393,117 | 7/1968 | Zolg et al. | 161—82 |
| 2,640,004 | 5/1953 | Van Saun | 161—50 |
| 2,705,498 | 4/1955 | Johnson | 161—143 X |
| 3,081,203 | 3/1963 | Beuscher | 134—28 |
| 3,309,254 | 3/1967 | Rowe | 156—240 |
| 3,340,606 | 9/1967 | Anderson et al. | 29—625 |
| 2,252,157 | 8/1941 | Bergin et al. | 117—126 XR |

JOHN T. GOOLKASIAN, Primary Examiner

W. E. HOAG, Assistant Examiner

U.S. Cl. X.R.

156—313; 161—192, 196, 200